3,119,886
PROCESS FOR THE ISOMERIZATION OF XYLENE

Karl Smeykal and Wilhelm Pritzkow, Leuna, Horst Knopel, Leipzig, and Siegfried Unger and Klaus Moll, Leuna, Germany, assignors to VEB Leuna-Werke Walter Ulbricht, Leuna, Germany
No Drawing. Filed Feb. 24, 1961, Ser. No. 91,345
3 Claims. (Cl. 260—668)

This invention relates to xylene and is particularly concerned with a novel process for the isomerization of xylene.

It is known in the art to convert pure xylene isomers or xylene mixtures whose composition does not conform to the thermo-dynamic equilibrium, into equilibrium mixtures by treatment in liquid phase with Friedel-Crafts catalysts.

It has also become known to effect the isomerization of xylene by using solid catalysts in gaseous phase. In doing so, synthetic or natural silicates which may have been activated with acids or aluminum oxide which has been treated with hydrofluoric acid, are used as catalysts. These catalysts are thus substances with acid characteristics. If the isomerization of xylene is carried out with catalysts of this kind, the latter lose their activity already after a few hours of reaction. The reason for this is that tar and coke-like deposits form on the surfaces of the catalyst, due to the relatively high operating temperatures which are necessary during the isomerization. It is, of course, possible to reactivate the catalysts by burning off these deposits with hot air, however, repeated reactivation of the catalysts, of course, significantly influences the economy of the isomerization procedure, particularly since such regeneration has to be effected rather frequently and in some instances every 10 hours of reaction.

Processes have also become known wherein the xylene is isomerized continuously without requiring a regeneration of the catalyst or only requiring infrequent regeneration thereof. Such processes operate with acid catalysts which contain a relatively small amount, usually 0.5 to 2.0% of platinum. In the presence of a sufficiently high partial pressure of hydrogen, the platinum apparently causes a hydrogenation of the compounds which deposit on the catalyst and which have the tendency to polymerize, so that resin formation or coking of these deposits is prevented. It is obvious that the isomerization of xylene with platinum containing catalysts has advantages as compared with an isomerization process using simple acid catalysts. However, platinum catalyst isomerization has the important drawback that considerable quantities of platinum are required for preparing the catalyst on a technical scale. This, of course, is expensive.

It has already been suggested to use as catalysts in the isomerization of xylenes oxides or sulfides of elements of the sixth subgroup of the periodic table in pure state or on inactive carriers, particularly aluminum oxide. Such catalysts are said to permit continuous operation without regeneration when the reaction is taking place in the presence of hydrogen under moderate pressure. Experience showed, however, that in the isomerization of xylenes oxides and sulfides of elements of the sixth subgroup in pure state or on inactive carriers are catalytically active to a very restricted extent only when the reaction is carried out at temperatures below 525° C., and that amounts of converted xylene obtained in this manner are by no means useful for technical or industrial purposes.

It is a primary object of this invention to overcome the drawbacks of the known isomerization processes referred to and to provide a process for the isomerization of xylene which is simple to carry out, inexpensive and which yields excellent results.

It is also an object of this invention generally to improve on isomerization processes for xylene and xylene mixtures.

Briefly, and in accordance with this invention, the disadvantages of known isomerization processes are overcome by effecting the isomerization of xylene in the presence of hydrogen, at elevated temperatures and under pressure in the presence of catalysts which comprise oxides and/or sulfides of elements of the 6th subgroup of the periodic table on a carrier material comprising synthetic aluminum silicates.

If catalysts of the described nature are used in the presence of hydrogen, at pressures above 5 atmospheres and at temperatures below 525° C., the catalyst may be used as long as 1500 hours before regeneration is required.

In accordance with this invention, it has also been found that particularly active catalysts, having an exceedingly long life, are obtained, if the aluminum silicate which serves as carrier for the catalyst proper, is prepared by intimate mixing of the individually precipitated and washed components, i.e., aluminum oxide or aluminum hydroxide and silicic acid. The components, however, should not be dried before the mixing. The other catalyst components, particularly molybdic acid and/or tungstic acid or the corresponding thio acids, may be added to the carrier in ammoniacal aqueous solution or suspension either during the intimate mixing of the carrier components or during their further processing, i.e., for example, after the drying or after the shaping of the carrier. A catalyst produced in such manner, which may have any desired form or shape, may be treated with hydrogen sulfide before being used in the xylene isomerization process. However, the catalysts have an excellent isomerization activity and a long life even if not treated with hydrogen sulfide.

Surprisingly, it has also been ascertained that catalysts of the kind described which contain both molybdic acid and tungstic acid or both molybdic sulfide and tungstic sulfide are more active and particularly have a still longer life, than catalysts which contain but one of the molybdenum or tungsten compounds.

The isomerization of xylene with the catalysts of this invention is advantageously carried out at temperatures between 400° and 525° C. and at a pressure between 5 and 100 atmospheres. The charge or load on the catalyst should preferably be between 0.5 and 2.0 vol. xylene/vol. catalyst an hour at xylene/hydrogen mole ratio between 1:1 and 1:50. Under these conditions the equilibrium between o-, m- and p-xylene is practically completely adjusted (see Table 1) while ethylbenzene participates in the reaction only to a very small extent. A dealkylation takes place as a secondary effect under the formation of toluene. By choosing the reaction conditions in a suitable manner, the percentage of the toluene formation calculated on the entire reaction may be kept below 5%.

The xylene isomerization according to this invention is industrially carried out in known manner in, for example, vertically arranged reactors wherein the catalyst masses of the nature described may be arranged either stationarily, in piece form, or in any other desired manner and form. The xylene to be isomerized is injected into the reactor in common manner by pumping it into the apparatus and is vaporized in a pre-heater together with hydrogen or with a gas containing hydrogen. The vapors are thereafter conducted through the catalyst zone and, after having passed through a heat regenerator, are condensed in a cooler. In a subsequent separator, the liquid xylene separates from hydrogen. The hydrogen which does not take part chemically in the isomerization reaction is then recycled to the process by means of a gas recycling pump. The isomerized xylene is released down to atmospheric pressure and then further processed. The apparatus for carrying out this process is of known construction and does not form part of this invention. The effect of the isomerization procedure may be constantly observed and checked by known analytical methods, for example, by gas chromatography or UR analysis. When the catalytic activity of the catalysts decreases, the catalyst may be reactivated by passing air thereover at temperatures between 400° and 600° C.

Many different starting materials may be used for carrying out the isomerization process of this invention. For example, pure individual xylene components or isomers or technical xylene mixtures may be used, the composition of which does not correspond to the thermodynamic equilibrium. If pure xylene is used as starting material, the meta and para compounds are more easily converted than the ortho compounds, if the raw material is passed through the apparatus but once.

The inventive process may particularly advantageously be carried out with technical xylenes which have been obtained by decomposition processes of such xylenes and wherein predetermined xylene isomers are removed either entirely or partly, so that the remaining xylene mixture does not any longer conform to the thermo-dynamic equilibrium. This is, for example, the case in the known separation of para-xylene from its mixtures with ethylbenzene and the other two xylene isomers by intense or deep cooling. In this operation about one half of the para-xylene present crystallizes and may be separated from the other components by filtration or centrifuging, and may be recovered in great purity. The filtrates obtained are thus poor on para-xylene and may now by means of the present process again be brought to the original content of para-xylene. By repeating the freezing and isomerization procedures successively, it is thus possible to recover about 60 to 70% of the xylenes which were originally present in the form of pure para-xylene.

Further, residual xylene mixtures which are obtained after the separation of o-xylene by distillation, may be converted to about 70 to 80% into o-xylene by repeated successive use of rectifying distillation and isomerization.

Finally, in the combined processing of technical xylene mixtures by freezing out para-xylene and by separating by distillation o-xylene on the one hand, and by isomerization of the remaining residual xylene on the other hand, a total amount of 70 to 85% of the originally present technical xylene mixture may be recovered in the form of pure para- and pure ortho-xylene.

The subsequent examples illustrate the practical performance of the isomerization process of this invention and also illustrate the superiority of the new isomerization catalysts as compared to prior art catalysts. It should be understood, however, that the examples are given by way of illustration and not by way of limitation and that many changes and alterations may be made, for example, in choice of starting materials, quantities, temperatures and process and reaction conditions in general, without departing in any way from the scope and spirit of this invention as recited in the appended claims.

TABLE 1

*Equilibrium of the Isomeric $C_8$ Aromatic Compounds (Percent)*

| Compound | Temperature | | | |
|---|---|---|---|---|
| | 25° C. | 125° C. | 425° C. | 525° C. |
| Ethylbenzene | 0.5 | 2.0 | 8.5 | 10.5 |
| o-Xylene | 16.5 | 18.5 | 22.5 | 23.0 |
| p-Xylene | 23.5 | 23.0 | 21.5 | 20.5 |
| m-Xylene | 59.5 | 56.5 | 47.5 | 46.0 |

EXAMPLE I

The starting material for this example was a mother liquor which had been obtained by freezing out the para-xylene component from a coal tar xylene. This mother liquor was isomerized with four different catalysts according to Table 2 below under identical reaction conditions. The catalyst charge was 1.2 vol. of mother liquor/vol. catalyst an hour, the mole ratio xylene:hydrogen was 1:10, the temperature was 500° C. and the pressure was 35 atmospheres.

Catalyst 1 was a synthetic aluminum silicate. This had been obtained from active alumina as commonly available on the market which had been thoroughly dried, and from a dried silica gel also as available on the market, by grinding and intimate mixing of the two components and subsequent peptization with diluted nitric acid and subsequent shaping and drying. The aluminum silicate obtained contained 60% by weight of $SiO_2$ and 40% by weight of $Al_2O_3$.

Catalyst 2 was a tungsten sulfide without any carrier whatsoever.

Catalyst 3 was obtained by soaking catalyst 1 with an ammoniacal molybdic acid solution and subsequent drying and annealing. This catalyst contained 16.3% of $MoO_3$.

Catalyst 4 was obtained by intimately mixing separately precipitated and washed—but not dried—aluminum hydroxide and silicic acid hydrogel. During this mixing, molybdic acid and tungstic acid in ammonia solution were added. After drying and pill formation of the catalyst, it contained 50% $SiO_2$, 35% $Al_2O_3$, 7% $MoO_3$ and 8% $WO_3$.

The results which were obtained by isomerizing the xylene mother liquor with the four different catalysts described above have been tabulated in Table 2.

TABLE 2

*Isomerization of a xylene mother liquor*

| Catalyst No. | Analysis of stripped product percent | | | | | Life in hours | |
|---|---|---|---|---|---|---|---|
| | Toluene | Ethylbenzene | o-xylene | m-xylene | p-xylene | Betw. two regenerations | Total |
| (¹) | 2 | 5 | 18 | 62 | 13 | | |
| 1 | 8 | 5 | 19 | 49 | 19 | 10 | 3,000 |
| 2 | 3 | 5 | 18 | 60 | 14 | | |
| 3 | 5 | 5 | 20 | 51 | 19 | 200 | 3,000 |
| 4 | 5 | 6 | 20 | 49 | 20 | 1,000 | 12,000 |

¹ Composition of starting product.

The table shows clearly that the inventive catalysts No. 3 and 4, which contain the oxides of the element molybdenum or the oxides of the elements molybdenum and tungsten on a synthetic aluminum silicate as carrier, may be used much longer than the simple aluminum silicate catalysts of No. 1. A further analysis of the table shows that the isomerization activity of the new catalysts Nos. 3 and 4 is far greater than that of a simple tungsten sulfide catalyst (No. 2). The pure tungsten sulfide catalyst of No. 2 has almost no isomerization activity at all at the employed reaction temperature of 500° C., so that no particulars as to its life can be given. A comparison between the novel catalysts Nos. 3 and 4 shows the superiority of those catalysts which contain both molybdenum oxide and tungsten oxide and whose carrier is produced from the individually precipitated and washed—but not dried—components aluminum hydroxide and silicic acid, over the catalysts which have a different composition or which have been prepared in a different manner.

EXAMPLE II

This example was carried out with a mother liquor which had been obtained by freezing out the para-xylene component from a coal tar xylene. This mother liquor was isomerized with five different catalysts according to Table 2 under identical reaction conditions. The catalyst charge was 1.2 vol. of mother liquor/vol. of catalyst an hour, the mole ratio of xylene:hydrogen was 1:12, the temperature was 500° C. and the pressure was 30 atmospheres.

Catalyst 5 was produced from active alumina as commonly available on the market, by soaking with an ammoniacal molybdic acid solution. After drying and tempering at 500° C., the catalyst contained 10% $MoO_3$.

Catalyst 6 was prepared from ordinary active alumina by soaking it with an ammonia solution of molybdic acid and hydrofluoric acid. Upon drying and tempering at 500° C., the catalyst contained 15% $MoO_3$ and 1.7% of fluorine.

Catalyst 7 was produced by the joint precipitation of the carrier components by mixing a water glass solution, aluminum sulfate solution and diluted hydrochloric acid, while maintaining a pH value of 5.5. Upon washing and drying the product was soaked with an ammonia solution of tungstic acid and molybdic acid. The catalyst, after drying of the catalyst powder and pill formation, contained after tempering at 500° C. 50% of $SiO_2$, 35% $Al_2O_3$, 7% $MoO_3$ and 8% $WO_3$.

Catalyst 8 was produced by intimately mixing separately precipitated and washed—but not dried—silicic acid hydrogel, aluminum hydroxide and an ammonia solution of molybdic acid. The catalyst upon drying and tempering at 500° C. contained 51% $SiO_2$, 34% $Al_2O_3$ and 15% $MoO_3$.

Catalyst 9 was identical with catalyst 4 of the first example.

The stripped products after isomerization were cooled down to the eutectic point, the para-xylene which separated in crystalline form was recovered by centrifuging in a centrifuge. The purity of the recovered para-xylene was 95%.

Table 3 reflects the results of the isomerization.

TABLE 3

*p-Xylene Yield Obtained From the Isomerisate (percent)*

| Hours of Operation | Catalyst No. | | | | |
|---|---|---|---|---|---|
| | 5 | 6 | 7 | 8 | 9 |
| 0–100 | 5.0 | 9.2 | 8.9 | 11.1 | 11.2 |
| 100–200 | 4.3 | 8.3 | 9.1 | 10.5 | 11.0 |
| 200–400 | 4.0 | 8.5 | 8.3 | 9.8 | 10.3 |
| 400–600 | | 7.0 | 8.1 | 8.8 | 9.8 |
| 600–800 | | 5.4 | 7.5 | 8.5 | 9.5 |
| 800–1,000 | | 4.4 | | 7.8 | 9.6 |
| 1,000–1,200 | | | | | 8.8 |
| 1,200–1,400 | | | | | 8.0 |
| After regeneration: | | | | | |
| 0–200 | 4.1 | 3.4 | 8.2 | 10.0 | 11.5 |
| 200–400 | 3.0 | 4.0 | 7.9 | 9.5 | 10.8 |
| 400–600 | | | 7.5 | 8.0 | 9.5 |

The regeneration of the catalysts was effected by burning off with air at 525° C. at normal pressure.

Table 3 shows clearly that the novel catalysts 7, 8 and 9 are by far superior to the known catalyst 5 in the xylene isomerization both with regard to their activity and particularly with regard to their life.

The table moreover shows that upon applying molybdic acid on an aluminum oxide which has been treated with hydrofluoric acid (No. 6), more active catalysts are obtained, than if molybdic acid and untreated aluminum oxide are used. However, it will also be noted that these fluorine-containing molybdenum oxide-aluminum oxide catalysts have a far shorter life than the other novel catalysts.

A comparison between the novel catalysts 7, 8 and 9 shows the superiority of such catalysts whose carrier is obtained from the individually precipitated and washed but undried components aluminum hydroxide and silicic acid by thorough mixing and subsequent drying (Nos. 8 and 9) as compared to such novel catalysts whose carrier material is produced in another way (No. 7). This superiority is particularly noticeable in the greater activity and the longer life of the catalysts.

The table moreover shows the particularly good activity which is obtained by adding molybdic acid and tungstic acid to the catalyst carrier prepared in accordance with this invention (catalyst No. 9).

EXAMPLE III

The starting product in this example was a reformation xylene which had been freed from o-xylene by distillation to a far reaching extent. This xylene contained 29% ethylbenzene, 5% o-xylene, 47% m-xylene and 19% p-xylene. This starting material was isomerized under identical reaction conditions in the presence of four different catalysts according to Table 4 below. The catalyst charge was 1.0 vol. of xylene/vol. catalyst an hour, the mole ratio xylene:hydrogen was 1:15, the temperature was 490° C., and the pressure was 40 atmospheres.

Catalyst 10 was identical with catalyst 5 of Example II.

Catalyst 11 was identical with catalyst 3 of Example I.

Catalyst 12 was identical with catalyst 8 of Example II.

Catalyst 13 was identical with catalyst 4 of Example I.

The stripped products were analyzed by gas chromatography for o-xylene.

The results are reflected in Table 4.

TABLE 4

*o-Xylene Content in the Isomerate (Percent)*

| Hours of Operation | Catalyst No. | | | |
|---|---|---|---|---|
| | 10 | 11 | 12 | 13 |
| 0–100 | 8 | 14 | 14 | 15 |
| 100–200 | 7 | 11 | 12 | 13 |
| 200–400 | 7 | 11 | 12 | 14 |
| 400–600 | 5 | 10 | 11 | 13 |
| 600–800 | | | 10 | 12 |
| 800–1000 | | | | 10 |
| After regeneration: | | | | |
| 0–200 | 8 | 10 | 13 | 14 |
| 200–400 | 6 | 9 | 12 | 12 |
| 400–600 | 5 | 9 | 11 | 12 |
| 600–800 | | | 11 | 11 |
| 800–1000 | | | 9 | 10 |

The regeneration of the catalysts was effected at 525° C. and at normal pressure by burning off with air.

The table shows that the novel catalysts Nos. 11, 12 and 13 are by far superior in activity to the known catalysts of No. 10.

The table moreover makes it clear that among the novel catalysts, those are superior whose carriers are obtained from the individually precipitated and washed—but not dried—components aluminum hydroxide and silicic acid by intimate mixing and subsequent drying (Nos. 12 and 13). It will be noted that these catalysts have an exceedingly long life.

EXAMPLE IV

98% ortho-xylene obtained by coal tar distillation was subjected to isomerization in a test furnace having a catalyst capacity of 80 cc.; the catalyst charge was 1.5 vol. xylene per 1 vol. catalyst per hour, at operating pressure of 45 atm. super pressure, temperature of 485° C., molar ratio of xylene:hydrogen 1:5. In the stripped product, the m-xylene content was determined gravimetrically as dinitro-m-xylene. The results are shown in Table 5.

Catalyst 14 contains 15% $Cr_2O_3$ and 85% $Al_2O_3$ and was made by soaking commercial active alumina with aqueous chromic acid solution and subsequent drying and annealing.

Catalyst 15 contains 15% $Cr_2O_3$, 51% $SiO_2$ and 34% $Al_2O_3$ and was obtained by intimately mixing of separately precipitated and washed, but undried silicic acid hydrogel, separately precipitated washed but undried aluminum hydroxide and aqueous ammonium chromate solution, subsequent drying and annealing at 600° C.

Catalyst 16 was identical with catalyst 1 from Example I.

Catalyst 17 was identical with catalyst 4 from Example I.

Catalyst 18 was obtained from catalyst 17 by treatment with gaseous $H_2S$ in absence of oxygen at 150° C. It contained the elements molybdenum and tungsten in form of their sulfides $MoS_2$ and $WS_2$.

TABLE 5

*m-Xylene Content in the Isomerate (Percent)*

| Hours of Operation | Catalyst No. | | | | |
|---|---|---|---|---|---|
| | 14 | 15 | 16 | 17 | 18 |
| 0–10 | 2 | 43 | 40 | 46 | 46 |
| 10–25 | 1 | 35 | 27 | 45 | 45 |
| 25–50 | | 23 | 13 | 40 | 45 |
| 50–100 | | 15 | 2 | 43 | 44 |
| 100–200 | | 7 | | 42 | 43 |
| 200–400 | | 3 | | 40 | 43 |
| 400–600 | | | | 41 | 43 |
| 600–800 | | | | 40 | 41 |
| 800–1,000 | | | | 40 | 40 |
| 1,000–1,200 | | | | 39 | 38 |
| 1,200–1,500 | | | | 36 | 35 |

The tests show that a $Cr_2O_3$ catalyst, in which the carrier has no acid properties (No. 14) is practically inactive. A catalyst according to the invention, which contains $Cr_2O_3$ on a synthetic aluminum silicate carrier (No. 15) exhibits, in comparison therewith, considerable isomerization activity and surpasses pure aluminum silicates without addition (No. 16) in activity and particularly in useful life. The catalysts according to the invention which contain both molybdenum and tungsten compounds (Nos. 17 and 18) have superior isomerization activity, oxidic and sulfidic catalysts being approximately equally active.

What is claimed is:

1. A process for isomerizing a member of the group consisting of a pure xylene isomer and non-equilibrium xylene mixtures, which comprises vaporizing said member, passing said vaporized member in the presence of hydrogen and at a temperature of between 400° and 525° C. and at a pressure of between 5 and 100 atmospheres over a catalyst comprising a member of the group consisting of molybdic oxide, molybdic sulfide, tungstic oxide, tungstic sulfide and mixtures thereof and a carrier substance comprising synthetically produced aluminum silicate.

2. A process as claimed in claim 1, wherein said aluminum silicate is prepared by precipitating and washing a member of the group consisting of aluminum oxide and aluminum hydroxide, precipitating and washing silicic acid, mixing said member and said silicic acid intimately while still being in moist condition and drying the mixture thus obtained.

3. A process as claimed in claim 1, wherein said catalyst comprises both a molybdenum and a tungsten compound.

References Cited in the file of this patent

UNITED STATES PATENTS

| 2,632,779 | Pfennig | Mar. 24, 1953 |
| 2,818,451 | Myers | Dec. 31, 1957 |
| 2,864,875 | McKinley | Dec. 16, 1958 |

OTHER REFERENCES

Sachanen: "Chemical Constituents of Petroleum" (1945), Reinhold Pub. Co., page 214, TP 690.S3c.